(12) United States Patent
Itoga

(10) Patent No.: US 7,798,522 B2
(45) Date of Patent: Sep. 21, 2010

(54) OCCUPANT RESTRAINING APPARATUS

(75) Inventor: Yasuo Itoga, Minato-ku (JP)

(73) Assignee: Takata Corporation, Tokyo (JP)

( * ) Notice: Subject to any disclaimer, the term of this patent is extended or adjusted under 35 U.S.C. 154(b) by 76 days.

(21) Appl. No.: 11/992,411

(22) PCT Filed: Nov. 8, 2006

(86) PCT No.: PCT/JP2006/322262

§ 371 (c)(1),
(2), (4) Date: Mar. 21, 2008

(87) PCT Pub. No.: WO2007/055235

PCT Pub. Date: May 18, 2007

(65) Prior Publication Data
US 2009/0134612 A1 May 28, 2009

(30) Foreign Application Priority Data
Nov. 14, 2005 (JP) .............................. 2005-329092

(51) Int. Cl.
*B60R 21/16* (2006.01)
(52) U.S. Cl. .................................................. 280/730.1
(58) Field of Classification Search .............. 280/730.1, 280/730.2, 733
See application file for complete search history.

(56) References Cited
U.S. PATENT DOCUMENTS

| | | | |
|---|---|---|---|
| 3,314,719 A * | 4/1967 | Johnson ....................... 297/481 |
| 3,791,670 A | 2/1974 | Lucore et al. |
| 5,445,411 A | 8/1995 | Kamiyama et al. |
| 5,765,869 A | 6/1998 | Huber |
| 5,820,162 A | 10/1998 | Fink |
| 5,902,010 A * | 5/1999 | Cuevas ................... 297/216.13 |
| 5,908,219 A * | 6/1999 | Bohmler .................. 297/216.1 |
| 5,947,514 A | 9/1999 | Keller et al. |
| 5,975,565 A * | 11/1999 | Cuevas ..................... 280/730.1 |
| 6,050,635 A * | 4/2000 | Pajon et al. .............. 297/216.1 |
| 6,062,597 A | 5/2000 | Suyama |
| 6,293,581 B1 | 9/2001 | Saita et al. |

(Continued)

FOREIGN PATENT DOCUMENTS
EP 0901942 A2 3/1999

(Continued)

OTHER PUBLICATIONS

Supplemental European Search Report mailing date of Oct. 23, 2009 for European Patent Application No. EP 06823166.

*Primary Examiner*—Faye M. Fleming
(74) *Attorney, Agent, or Firm*—Foley & Lardner LLP

(57) ABSTRACT

An occupant restraining apparatus that allows for a comfortable seat cushion and does not require an installation space for an inflator along a side of a seat frame is provided. An inflatable seat bag 20 is disposed above a seat pan 5. The seat bag 20 extends in a left-right width direction of a seat. An inflator 23 is mounted on a side frame 1*a* by means of a mounting bracket 24 and is disposed above the side frame 1*a*. A seat cushion 25 is disposed on a base frame 1. The seat cushion 25 has a side bank portion 25*a* whose bottom surface is provided with a recess 25*b*. The inflator 23 is disposed within the recess 25*b*.

5 Claims, 5 Drawing Sheets

U.S. PATENT DOCUMENTS

| | | |
|---|---|---|
| 6,349,964 B1 | 2/2002 | Acker et al. |
| 6,425,602 B1 | 7/2002 | Al-Amin et al. |
| 6,543,804 B2 | 4/2003 | Fischer |
| 6,715,788 B2 * | 4/2004 | Saiguchi et al. .......... 280/730.1 |
| 6,863,298 B2 | 3/2005 | Sakai et al. |
| 7,063,350 B2 | 6/2006 | Steimke et al. |
| 7,086,663 B2 | 8/2006 | Honda |
| 7,178,826 B2 * | 2/2007 | Acker et al. ............ 280/730.2 |
| 7,322,604 B2 * | 1/2008 | Itoga et al. ................. 280/733 |
| 7,377,544 B2 * | 5/2008 | Itoga ......................... 280/733 |
| 7,413,220 B2 * | 8/2008 | Itoga et al. ................. 280/742 |
| 7,481,452 B2 * | 1/2009 | Itoga et al. ................. 280/733 |
| 2001/0011810 A1 | 8/2001 | Saiguchi et al. |
| 2002/0125702 A1 | 9/2002 | Ohhashi |
| 2002/0153715 A1 | 10/2002 | Namiki |
| 2003/0030257 A1 | 2/2003 | Thomas et al. |
| 2003/0160433 A1 | 8/2003 | Kumagai et al. |
| 2003/0230872 A1 | 12/2003 | Sakai et al. |
| 2004/0155436 A1 | 8/2004 | Saiguchi et al. |
| 2004/0163872 A1 * | 8/2004 | Lincoln et al. ............. 180/271 |
| 2004/0164532 A1 | 8/2004 | Heidorn et al. |
| 2004/0178616 A1 * | 9/2004 | Yoshikawa ................. 280/748 |
| 2005/0184491 A1 * | 8/2005 | Itoga ....................... 280/730.1 |
| 2005/0189752 A1 * | 9/2005 | Itoga et al. ................. 280/741 |
| 2006/0103120 A1 | 5/2006 | Kurimoto et al. |
| 2006/0208471 A1 | 9/2006 | Sundararajan et al. |
| 2006/0284402 A1 | 12/2006 | Schramm et al. |
| 2007/0052223 A1 | 3/2007 | Parkinson et al. |
| 2007/0063493 A1 | 3/2007 | Higuchi et al. |
| 2007/0080526 A1 | 4/2007 | Itoga |

FOREIGN PATENT DOCUMENTS

| | | |
|---|---|---|
| EP | 1568537 A1 * | 8/2005 |
| EP | 1568549 A1 * | 8/2005 |
| JP | 2000-25545 | 1/2000 |
| JP | 2002-79861 | 3/2002 |
| JP | 2002-145002 | 5/2002 |
| JP | 2004-17686 | 1/2004 |
| JP | 2004-189187 | 7/2004 |
| JP | 2004-359207 | 12/2004 |
| JP | 2005-22440 | 1/2005 |
| JP | 2005-22596 | 1/2005 |
| JP | 2005-231504 | 9/2005 |
| JP | 2005239055 A * | 9/2005 |
| JP | 2005-271888 | 10/2005 |

* cited by examiner

US 7,798,522 B2

OCCUPANT RESTRAINING APPARATUS

TECHNICAL FIELD

The present invention relates to an occupant restraining apparatus for restraining an occupant when a vehicle is involved in a collision, and particularly, to an occupant restraining apparatus for use in a vehicle that includes a seat bag provided below a front portion of a seat cushion and/or an air belt extended along a front side of an occupant, and an inflator for supplying gas to the seat bag and/or the air belt.

BACKGROUND ART

As a system for restraining an automobile occupant at the time of a collision, there has been proposed an apparatus that raises a front portion of a seat cushion upward during a vehicle collision to prevent a so-called submarine phenomenon. Specifically, a submarine phenomenon can occur when an occupant wearing a seatbelt slips through a space below a lap belt during a frontal collision. For example, Japanese Unexamined Patent Application Publication No. 2002-79861 discloses a vehicle seat in which the front portion of the seat cushion can be pushed upward by an airbag. In this disclosure, an inflator is set on a seat pan that is located below a thigh-supporting section of the seat cushion.

Known types of occupant restraining apparatuses are, for example, a so-called air belt apparatus having an airbag attached to a part of a seatbelt (e.g. a shoulder belt portion and/or a lap belt portion) or an airbag constituting a part of a seatbelt, and a so-called inflatable seatbelt apparatus.

Japanese Unexamined Patent Application Publication No. 2002-145002 discloses an occupant restraining apparatus that restrains an occupant by inflating three components, which are a seat bag provided at a front portion of a seat cushion, and a shoulder belt portion and a lap belt portion of an air belt. In this disclosure, the seat bag, the shoulder belt portion, and the lap belt portion are inflated by means of a single inflator.

In the occupant restraining apparatus disclosed in Japanese Unexamined Patent Application Publication No. 2002-145002, the inflatable shoulder belt portion and the inflatable lap belt portion have one of their ends connected to separate tongues. The shoulder belt portion and the lap belt portion are latched to a buckle device by means of their tongues. The buckle device and the tongues are provided with gas supply paths for supplying the gas from the inflator to the shoulder belt portion and the lap belt portion. This inflator is provided at a left side of a seat frame.

Japanese Unexamined Patent Application Publication No. 2000-25545 describes an air belt apparatus in which a bag is inflatable by means of gas from an inflator. In this air belt apparatus, the inflator is provided at an air-belt anchor.

Patent Document 1: Japanese Unexamined Patent Application Publication No. 2002-79861

Patent Document 2: Japanese Unexamined Patent Application Publication No. 2000-25545

Patent Document 3: Japanese Unexamined Patent Application Publication No. 2002-145002

If an inflator is to be disposed above a seat pan, the thickness of the seat cushion at that section will need to be reduced, and therefore, the seat cushion will become uncomfortable to sit in.

If an inflator is to be provided alongside a side of a seat frame, it will become necessary to make an installation space for the inflator alongside the seat frame, leading to reduced design flexibility of the seat.

SUMMARY OF THE INVENTION

An object of the present invention is to provide an occupant restraining apparatus that allows for a comfortable seat cushion and does not require an installation space for an inflator along a side of a seat frame.

An occupant restraining apparatus for a vehicle according to the present invention includes at least one of a seat bag and an air belt, the seat bag having a bag and provided below a seat cushion, the air belt having a bag and extended along a front side of an occupant; and an inflator that supplies gas into the bag. The inflator is disposed within at least one of a side portion of the seat cushion and a side portion of a seat back.

An occupant restraining apparatus according to a first aspect is directed to an occupant restraining apparatus for use in a vehicle, which includes a seat bag disposed below a seat cushion and an inflator that supplies gas into the seat bag. In the apparatus, the inflator is disposed within a side portion of the seat cushion or of a seat back.

An occupant restraining apparatus according to a second aspect is directed to an occupant restraining apparatus for use in a vehicle, which includes an air belt extended along a front side of an occupant and an inflator that supplies gas to the air belt. In the apparatus, the inflator is disposed within a side portion of a seat cushion or of a seat back.

An occupant restraining apparatus according to a third aspect is directed to an occupant restraining apparatus for use in a vehicle, which includes a seat bag disposed below a seat cushion, an air belt extended along a front side of an occupant, and an inflator that supplies gas to the seat bag and the air belt. In the apparatus, the inflator is disposed within a side portion of the seat cushion or of a seat back.

In the occupant restraining apparatus according to the present invention, a bottom surface of the side portion of the seat cushion or a rear surface of the side portion of a back cushion may be provided with a recess, such that the inflator is disposed within the recess.

DETAILED DESCRIPTION

In the present invention, since an inflator is disposed within a side portion of a seat cushion or of a seat back, there are no thickness reductions in the supporting sections (hip supporting section and thigh supporting section) of the seat cushion. Thus, the seat is comfortable to sit in. In addition, it is not necessary to make an installation space for the inflator along a side of a seat frame.

The present invention may include a structure provided with only a seat bag or only an air belt, or a structure provided with both a seat bag and an air belt.

If a seat bag and an air belt are both provided, they may be inflated by means of a common inflator or by means of separate inflators.

Embodiments of the present invention will be described below with reference to the drawings.

Figure 1:
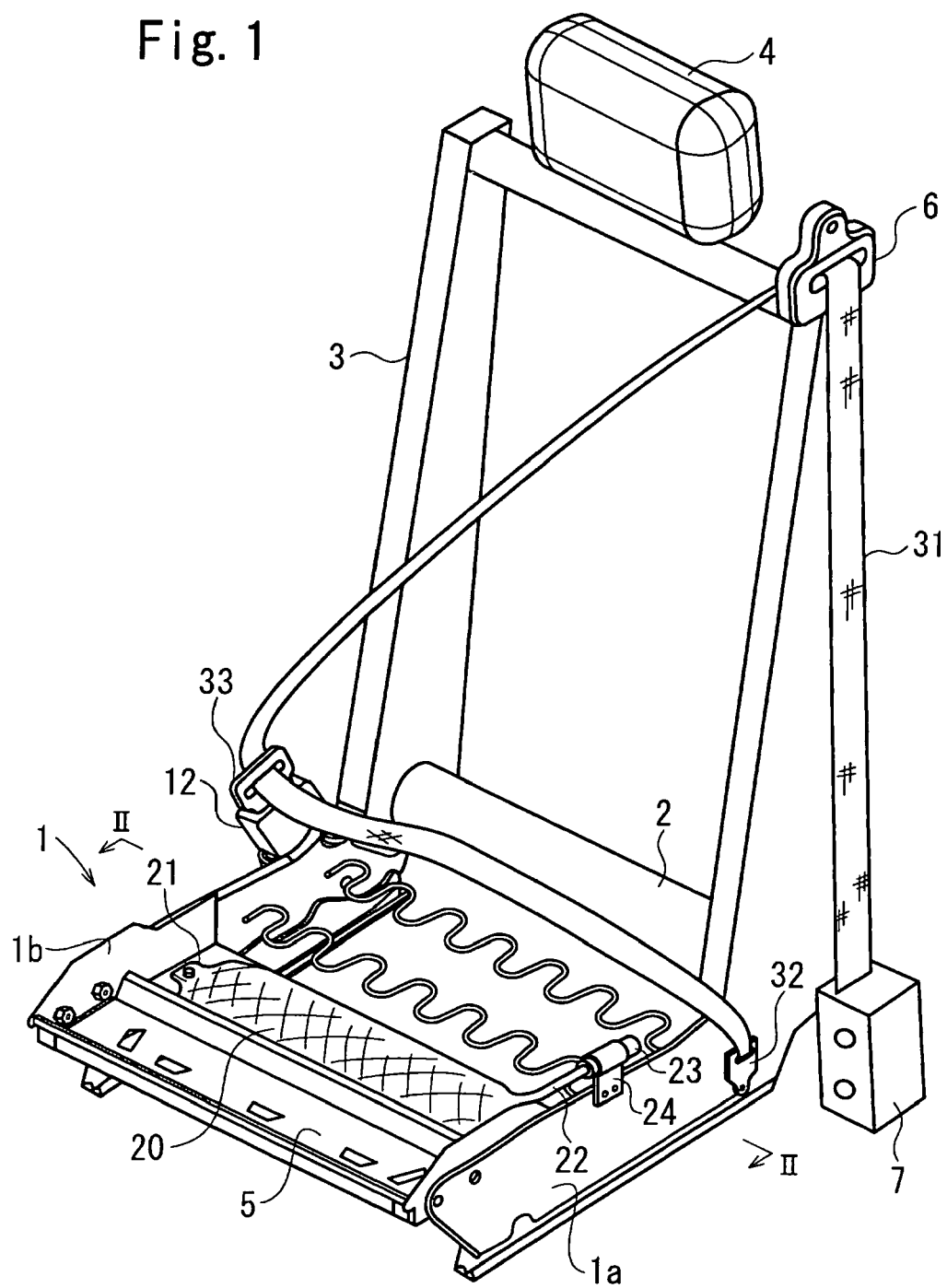
FIG. 1 is a perspective view showing a frame of a seat equipped with an occupant restraining apparatus according to an embodiment in a state where a seat cushion is omitted.
Figure 2:
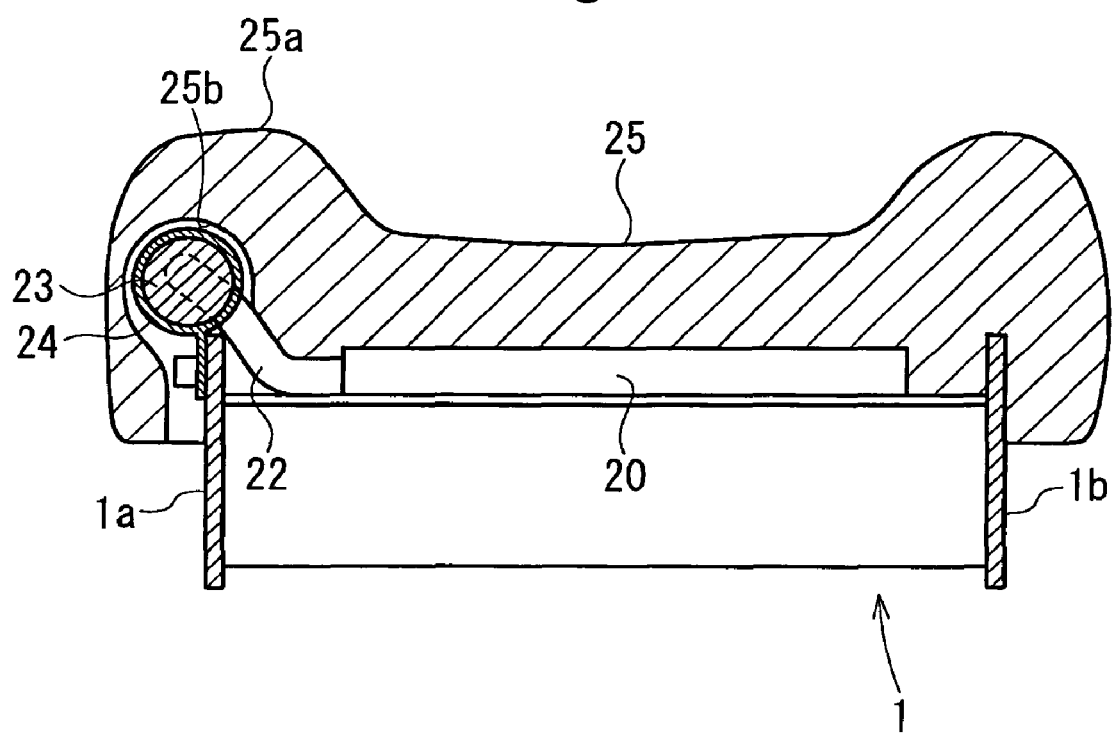
FIG. 2 is a cross-sectional view of the seat provided with the seat cushion taken along line II-II in FIG. 1.

FIG. 1 is a perspective view of a seat frame of an automobile equipped with an occupant restraining apparatus according to an embodiment. FIG. 2 is a cross-sectional view taken along line II-II in FIG. 1. FIG. 1 shows a state where a seat cushion 25 is omitted.

The frame constituting a seat of the automobile includes a base frame 1 and a back frame 3 that is rotatably connected to the base frame 1 by means of a support shaft 2 and a reclining device (not shown). An upper portion of the back frame 3 has a headrest 4 attached thereto.

The base frame 1 includes left and right side frames 1a and 1b and a seat pan 5 bridged between front portions of the side frames 1a and 1b. Reference numeral 6 denotes a shoulder anchor for a seatbelt, and reference numeral 7 denotes a seatbelt retractor.

An inflatable seat bag 20 is disposed above the seat pan 5. The seat bag 20 extends in the left-right width direction of the seat. Ear-shaped fixing segments 21 are provided at opposite ends of the seat bag 20 in the longitudinal direction (i.e. the left-right direction) thereof. These fixing segments 21 are fixed to the seat pan 5 with bolts (not given a reference numeral).

Although not shown, the seat bag 20 includes a main bag body folded in an elongated shape, and a tubular mesh webbing that surrounds the folded main bag body. The mesh webbing is formed of a knit fabric that is expandable in its radial direction but is substantially non-expandable in its longitudinal direction (i.e. the left-right direction of the seat).

One end of the seat bag 20 in the longitudinal direction thereof is provided with a gas inlet. This gas inlet has a gas supply pipe 22 connected thereto, which extends from an inflator 23 to be described hereinafter. The inflator 23 is mounted on the side frame 1a by means of a mounting bracket 24 and is disposed above the side frame 1a.

The base frame 1 has the seat cushion 25 disposed thereon. The seat cushion 25 has a side bank portion 25a whose bottom surface is provided with a recess 25b. The inflator 23 is disposed within the recess 25b.

In this embodiment, the inflator 23 is substantially cylindrical and extends in the front-rear direction of the seat. Accordingly, the recess 25b also extends in the front-rear direction of the seat.

A webbing 31 is provided in an extendable fashion along a front side of a seated occupant. The webbing 31 is formed of an ordinary non-expandable belt material. An intermediate portion of the webbing 31 is hooked through a through portion (through anchor: not given a reference numeral) of a tongue 33. The rear end of the webbing 31 is hooked through the shoulder anchor 6 provided at an upper section of a side surface of the vehicle cabin (such as a pillar), and is connected to the seatbelt retractor 7 in a retractable manner.

The front end of the webbing 31 is connected to the side frame 1a by means of an anchor portion 32.

An outer side surface of the side frame 1b is provided with a buckle device 12 to which the tongue 33 is connected in a detachable fashion.

When a vehicle equipped with the above-described occupant restraining apparatus shown in FIGS. 1 and 2 is involved in a frontal collision of a predetermined magnitude or greater, the inflator 23 is activated. Then, the gas from the inflator 23 is supplied to the seat bag 20 through the pipe 22 so as to inflate the seat bag 20, thereby restraining the waist portion of the occupant from moving forward.

In this embodiment, the inflator 23 is disposed within the side bank portion 25a of the seat cushion 25 so that a hip-supporting section and a thigh-supporting section of the seat cushion 25 can have a sufficiently large thickness. Thus, the seat cushion 25 is comfortable to sit in. In addition, it is not necessary to provide a space for disposing the inflator at an outer side surface of the side frame 1a.

Figure 3:
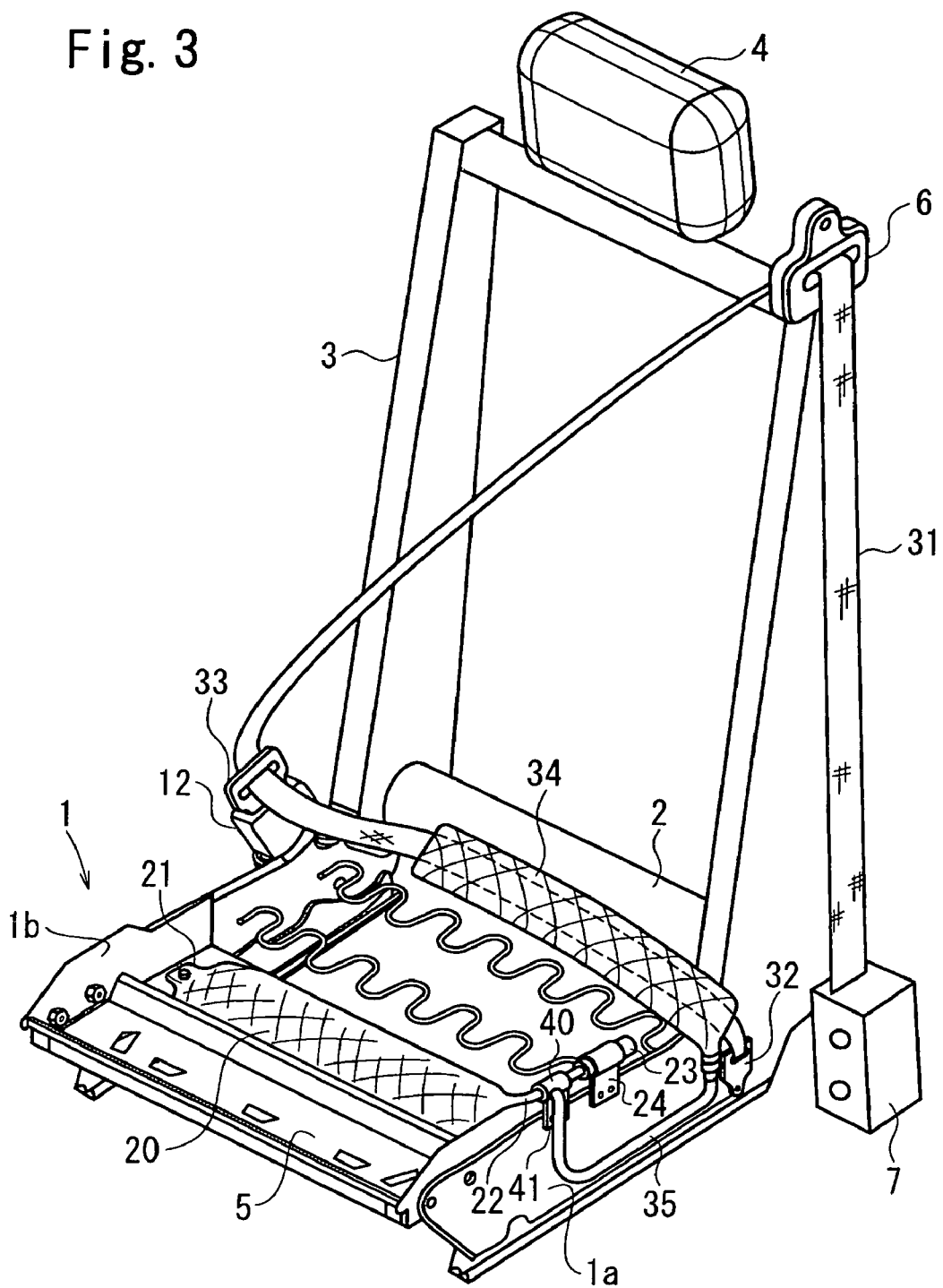
FIG. 3 is a perspective view showing a frame of a seat equipped with an occupant restraining apparatus according to another embodiment.

FIG. 3 is a perspective view of a seat frame according to another embodiment.

In this embodiment, the front end of the webbing 31 is connected to one end of a lap bag 34, and the other end of the lap bag 34 is connected to the side frame 1a by means of the anchor portion 32.

Although not shown, the lap bag 34 includes an inflatable main bag body and a tubular cover that covers the main bag body. Normally, the main bag body is folded in a flat and elongated shape. In this embodiment, when the main bag body is in a non-inflated state, the cover has a size that fits around the outer periphery of the folded main bag body, but when the main bag body is inflated, the cover expands in the circumferential direction thereof to permit the inflation of the main bag body.

In this embodiment, the cover is formed of the same knit fabric as that used for the mesh webbing of the seat bag 20. In other words, the knit fabric used for the cover is expandable in the circumferential direction but is substantially non-expandable in the longitudinal direction. Therefore, when the main bag body is inflated, the meshes of the cover expand in the circumferential direction with the stretching of the cover in the circumferential direction. As a result, the size of the cover in the longitudinal direction becomes smaller (shorter). This causes the webbing 31 to become tighter, whereby the webbing 31 becomes in close contact with the occupant's body.

The lap bag 34 receives gas from the inflator 23 via a duct 35 and a manifold 40.

In this embodiment, the pipe 22 connects the manifold 40 to the seat bag 20. The manifold 40 is attached to the side frame 1a by means of a bracket 41 and is disposed above the side frame 1a. The manifold 40 is also disposed within the recess 25b of the seat cushion 25.

The remaining elements in FIG. 3 are the same as those in FIG. 1, and therefore, the same elements are indicated with the same reference numerals.

When a vehicle equipped with the above-described occupant restraining apparatus shown in FIG. 3 is involved in a frontal collision of a predetermined magnitude or greater, the inflator 23 is activated. Then, the gas from the inflator 23 is supplied to the seat bag 20 and the lap bag 34 through the pipe 22 and the duct 35, thereby inflating the bags 20 and 34. The inflated seat bag 20 restrains the waist portion of the occupant from moving forward. Likewise, the inflated lap bag 34 restrains the waist portion of the occupant and its vicinity as well as absorbing the shock. In addition, when the lap bag 34 is inflated, the length of the lap bag 34 in the longitudinal direction is reduced, thereby causing the webbing 31 to become tighter. Thus, the upper torso of the occupant is restrained.

Figure 4:
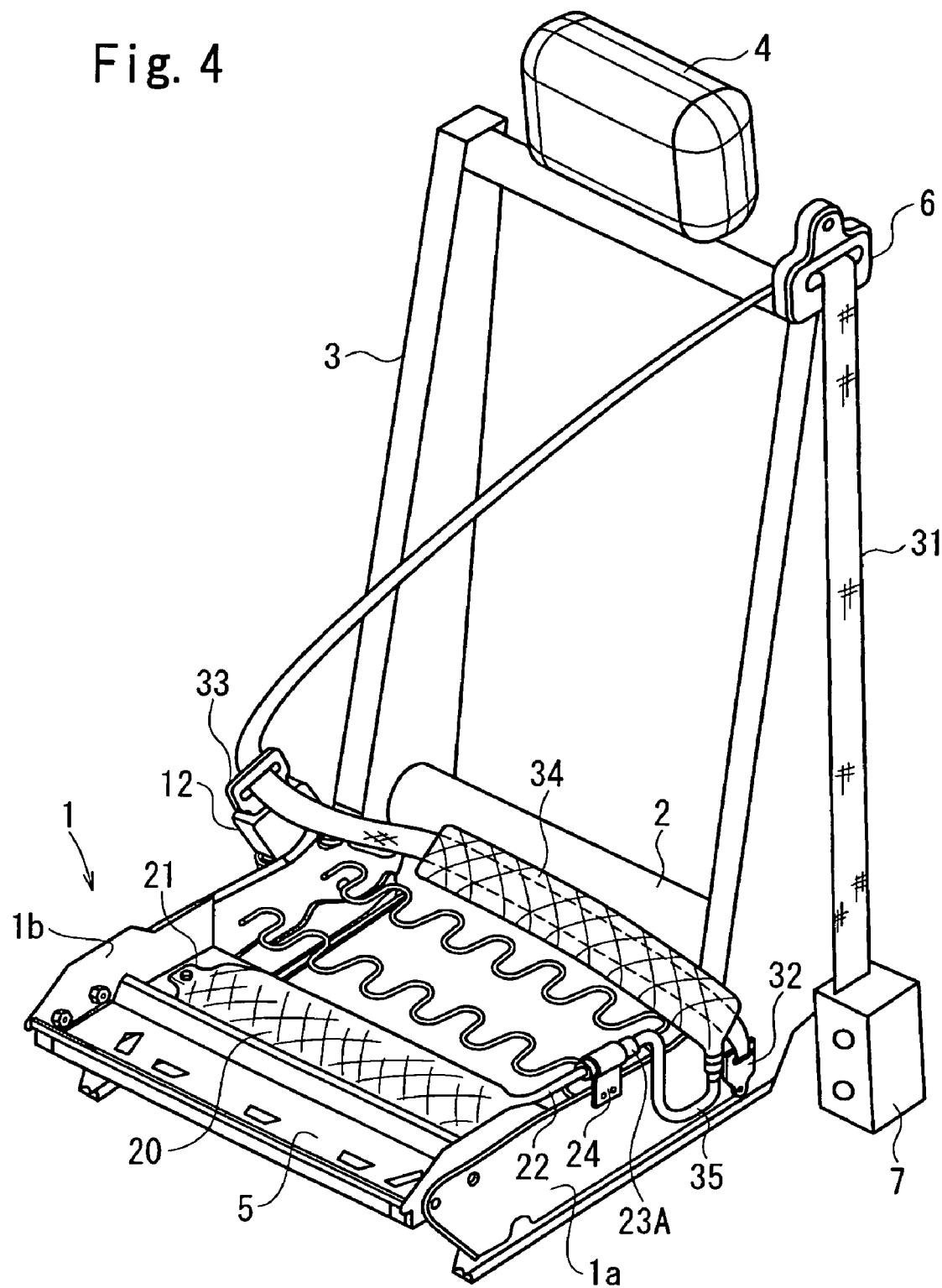
FIG. 4 is a perspective view showing a frame of a seat equipped with an occupant restraining apparatus according to another embodiment.

FIG. 4 shows a dual-type inflator 23A having two gunpowder storage chambers, each having an igniter and a gas outlet. The inflator 23A also has a substantially cylindrical shape and has gas outlets at front and rear ends thereof.

The front gas outlet has the pipe 22 connected thereto, and the rear gas outlet has the duct 35 connected thereto. When the gunpowder in the front chamber of the inflator 23A is ignited, the seat bag 20 is inflated. Likewise, when the gunpowder in the rear chamber is ignited, the lap bag 34 is inflated.

This inflator 23A is also accommodated within the recess 25b of the seat cushion 25 (not shown in FIG. 4). The remaining elements in FIG. 4 are the same as those in FIG. 3, and therefore, the same elements are indicated with the same reference numerals.

Figure 5:
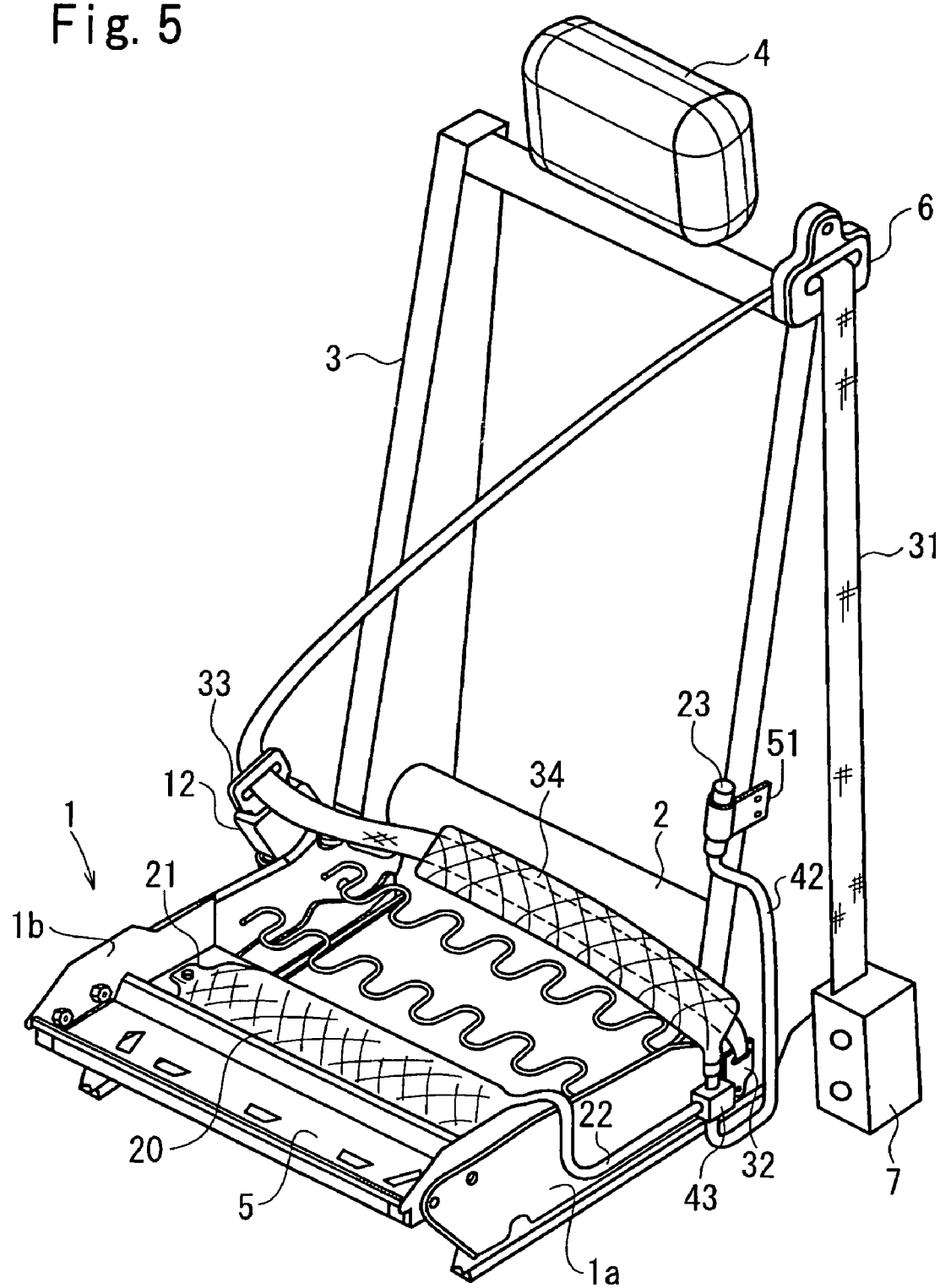
FIG. 5 is a perspective view showing a frame of a seat equipped with an occupant restraining apparatus according to another embodiment.

Although the inflator 23 is mounted on the base frame 1 in the above embodiments, the inflator 23 may alternatively be attached to the back frame 3 as shown in FIG. 5. The gas discharged from this inflator 23 can be supplied to the lap bag 34 through a duct 42 and a manifold 43 and can also be supplied to the seat bag 20 through the pipe 22.

The inflator 23 is substantially cylindrical and is disposed in the vertical direction. The inflator 23 is positioned in front of the back frame 3 and is attached to the back frame 3 by means of a bracket 51. The inflator 23 is accommodated within a recess provided at the rear surface of a side portion of a back cushion (not shown) for a seat back. Although the seat bag 20 and the lap bag 34 are both provided in FIG. 5, a structure in which only the seat bag 20 is provided is also permissible.

The present invention can include a structure in which only the air belt is provided. In a case where both the seat bag and the air belt are provided, a seat-bag inflator and an air-belt inflator may be separately provided.

The present invention can include a structure in which the inflator is used for inflating other bags such as a side airbag (not shown).

The above embodiments are examples of the present invention, and therefore, the present invention is not limited to the above embodiments.

This application is based on Japanese Patent Application (No. 2005-329092) filed on Nov. 14, 2005, the entire contents of which are incorporated herein by reference.

The invention claimed is:

1. An occupant restraining apparatus for a vehicle, comprising:
    at least one of a seat bag and an air belt, the seat bag having a bag and provided below a seat cushion of a seat, the air belt having a bag and extended along a front side of an occupant; and
    an inflator that supplies gas into the bag,
    wherein the inflator is disposed within a side portion of the seat cushion,
    wherein the inflator is connected to a first side frame of a seat bottom base frame via a mounting bracket, and
    wherein the inflator is positioned in a recess of a side bank portion of the seat cushion.

2. The occupant restraining apparatus according to claim 1, wherein the inflator is disposed above the side frame.

3. The occupant restraining apparatus according to claim 2, wherein the inflator extends in a front-rear direction of the seat.

4. The occupant restraining apparatus according to claim 1, further comprising a side airbag to which gas is supplied by the inflator.

5. The occupant restraining apparatus according to claim 1, wherein the seat bottom base frame includes the first side frame and a second side frame, wherein the first side frame includes an anchor portion for a lap belt, and wherein the second side frame includes a buckle device.

* * * * *